United States Patent Office 2,788,798
Patented Apr. 16, 1957

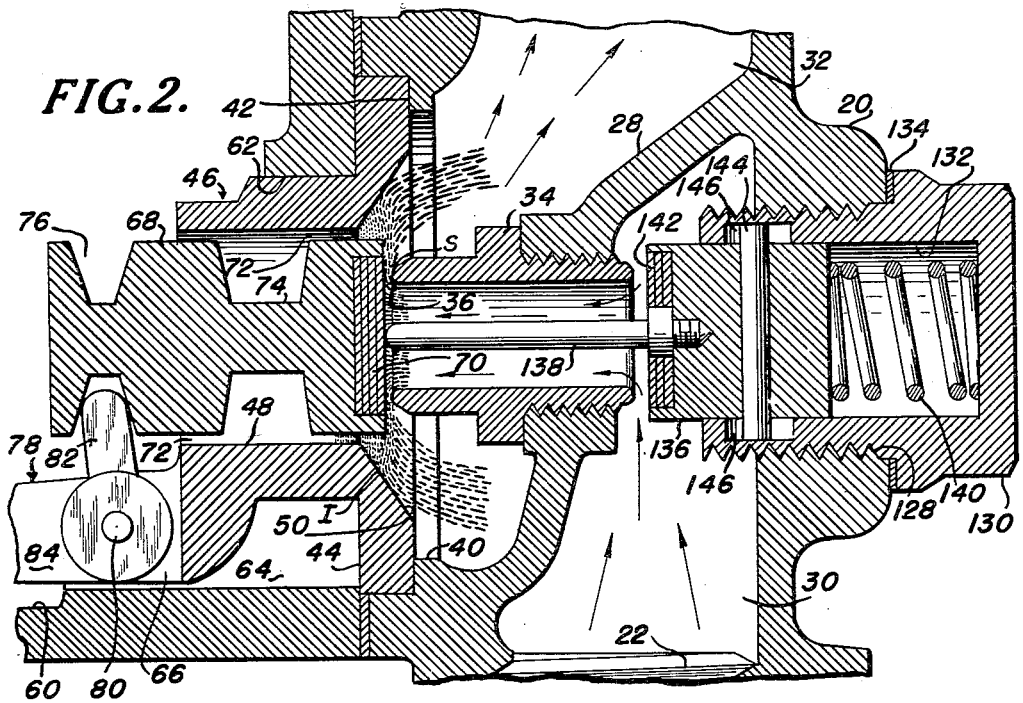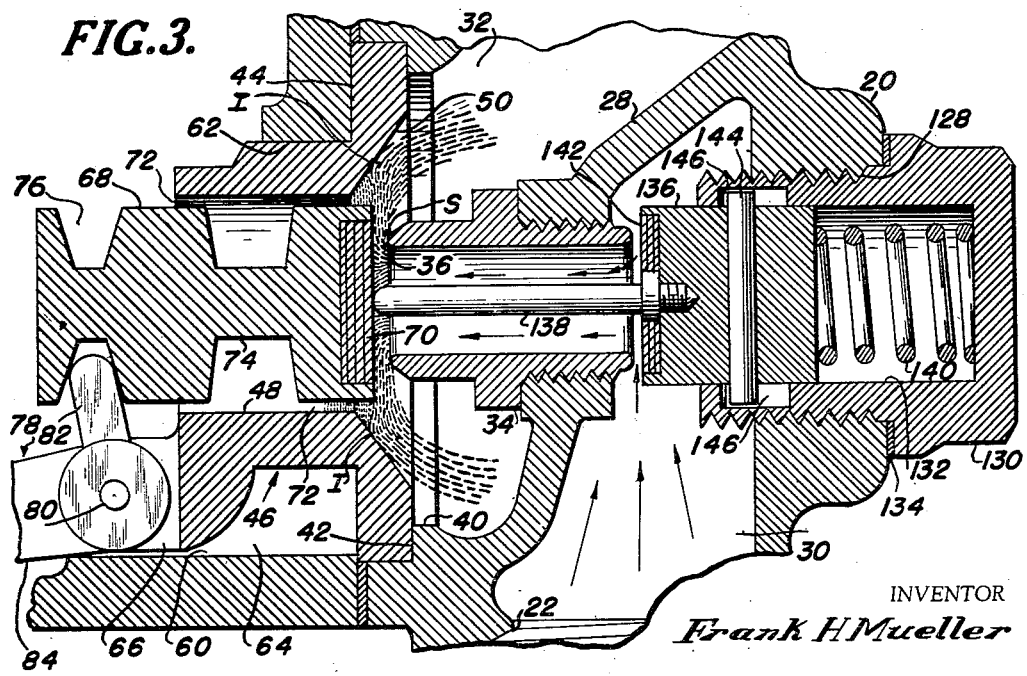

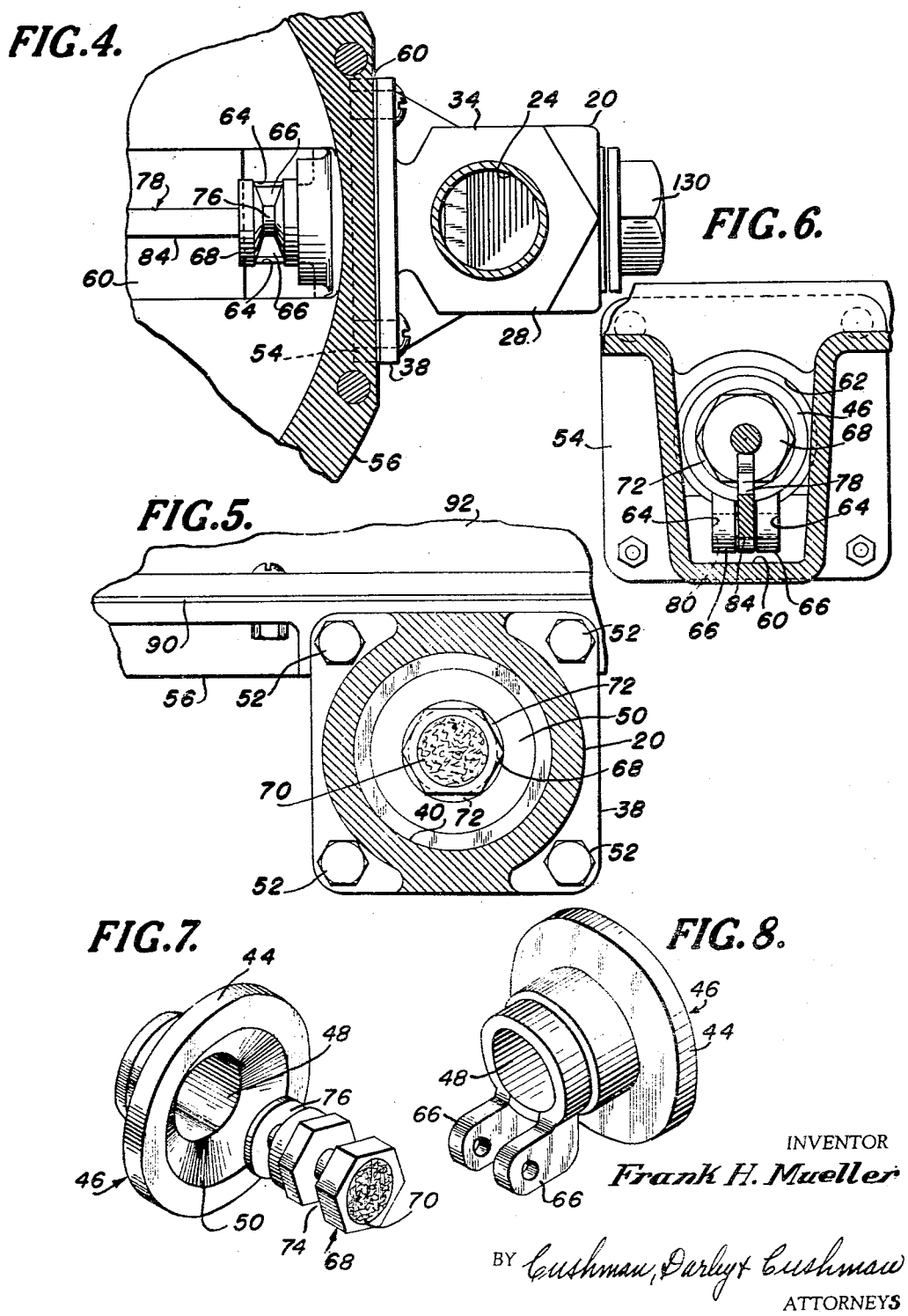

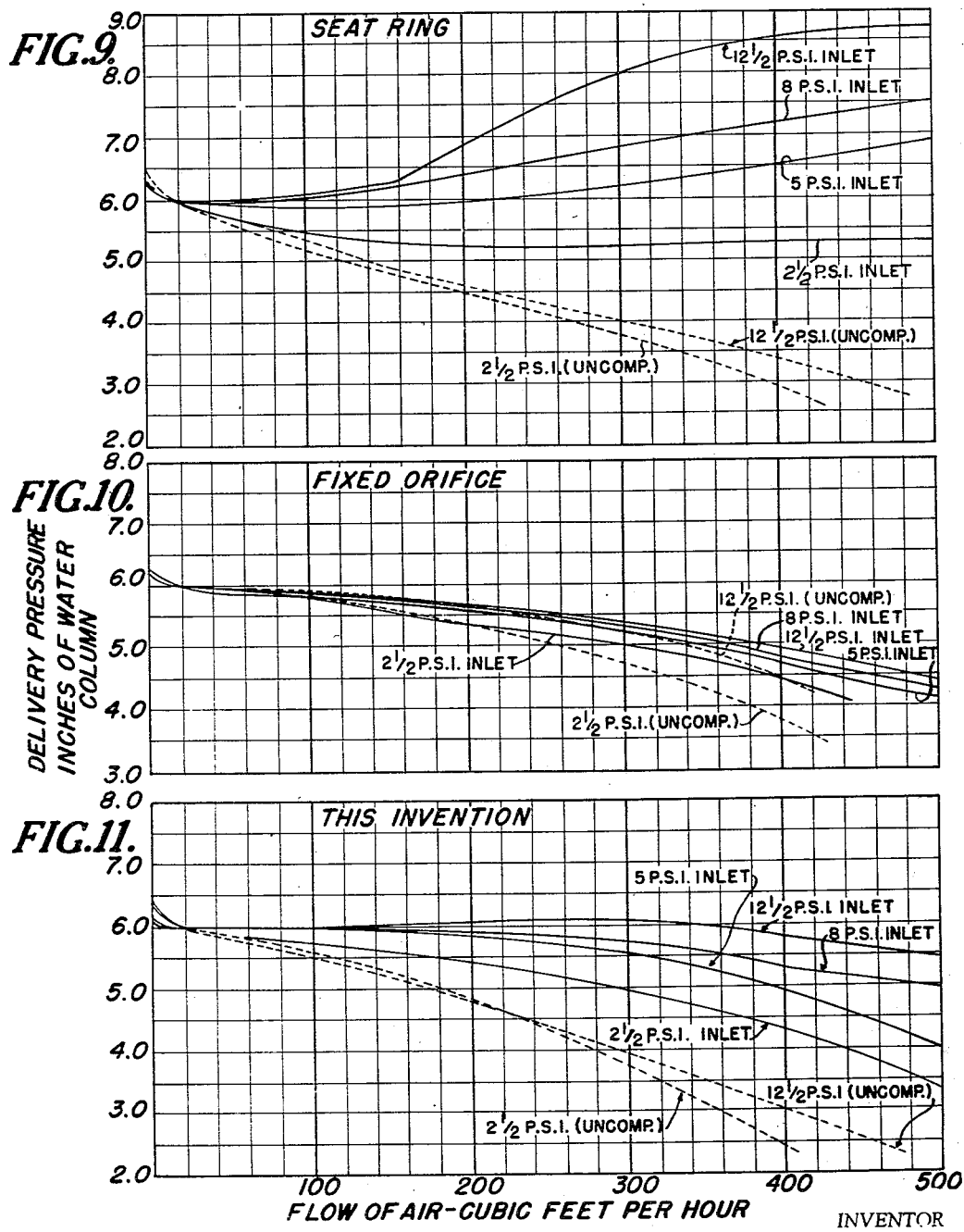

2,788,798
GAS PRESSURE REGULATOR

Frank H. Mueller, Decatur, Ill., assignor to Mueller Co., Decatur, Ill., a corporation of Illinois Application December 24, 1952, Serial No. 327,811

24 Claims. (Cl. 137—456)

This invention relates to a fluid pressure regulator, and more particularly to a regulator primarily intended for reducing gas pressure in street mains to a lower pressure for use in dwellings and residences.

Pressures in gas mains vary considerably from city to city throughout the entire country, usually, however, being of the order of from 5 to 15 pounds per square inch, while most gas appliances in dwellings are designed for use at a pressure of between 6 to 8 inches of water column (7" W. C. equals ¼ p. s. i.) and an overall total consumption in any one residence of not over about 400 C. F. H. (cubic feet per hour). Accordingly, gas pressure regulators of the type under consideration should be able to reduce a main pressure of from 5 to 15 p. s. i. to a delivery pressure of from 6" to 8" W. C. and to maintain the delivery pressure substantially constant, and as near as possible to the regulator setting, from minimum to capacity flow (about 400 C. F. H.).

Gas pressure regulators of the type in question have an inlet chamber, an outlet or recovery chamber, a port or orifice therebetween, a valve controlling the port, and a pressure or control chamber having a movable wall (usually a diaphragm) to which the valve is connected for movement therewith. The valve-diaphragm connection is such that movement of the diaphragm inwardly of the control chamber opens the valve and vice versa. An adjustable spring urges the diaphragm inwardly to open the valve while the pressure in the control chamber (communicated thereto from the outlet side of the regulator valve) urges the diaphragm outwardly to close the valve. Thus, the spring and control pressure counterbalance each other to maintain a valve lift that theoretically provides a predetermined reduced delivery pressure that is constant for all flow rates through the regulator up to the design capacity thereof, which, as previously stated, is of the order of 400 C. F. H.

The delivery pressure, in regulators of this type may be changed, within limits, by adjusting the compression on the spring. The set delivery pressure is defined as the pressure in the regulator outlet at no-flow condition, i. e., wherein the control pressure is high enough to close and seal the valve against the force of the spring. The actual delivery pressure at minimum flow conditions (always taken at 20 C. F. H. in gas regulators) is less than the set delivery pressure, however, because of the pressure increment necessary to seal the regulator valve against its seat after contact therewith. This delivery pressure at minimum flow conditions is termed "lock-off" pressure.

Unless special compensating means are used in gas regulators of this general nature, that is, old type regulators wherein the control pressure is the actual delivery pressure, the delivery pressure progressively decreases below "lock-off" with increased flow, such pressure drop from minimum flow to capacity flow being of the order of 1½" W. C. This pressure drop is caused by several factors, including changes in effective area of the diaphragm upon movements thereof, changes in spring loading because of spring extension, friction losses, etc. The pressure drop becomes rather serious because, as previously stated, most domestic gas appliances are designed for use at a pressure of 6" to 8" W. C. and there is a pressure drop of about ½" W. C. in the gas meter (regulators usually are connected ahead of the meter) and a permissible pressure drop of ⁷⁄₁₀" W. C. in house piping. Hence, at capacity flow in old-type pressure regulators, the overall pressure drop from a "lock-off" pressure of about 7" W. C. might be 2.7" W. C., so that the gas appliances would be receiving gas at a pressure considerably less than that for which they were designed.

In order to overcome the disadvantages of the old-type regulators described above and to eliminate the pressure drop therein at capacity flow, various types of regulators have been developed, substantially all of which operate on an ejector or aspirating-action principle. There are two main types of these aspirating-action regulators, one may be termed a "fixed-orifice" type which includes a Pitot tube or a venturi, and the other a "seat-ring" type.

The fixed-orifice regulator usually has a restriction in the flow path between the regulator valve and the regulator outlet, and a duct provides communication between the throat of this restriction and the control chamber of the regulator. Hence, at higher flow rates the increased velocities through such restriction lower the static pressure in the control chamber to cause the regulator valve to open more. This opening of the valve, in turn, raises the actual delivery pressure up to about its set delivery pressure. The fixed-orifice regulator works fairly satisfactorily for a given pressure differential, that is, the difference between the inlet pressure and the set delivery pressure of the regulator, and maintains a fairly constant delivery pressure from minimum to capacity flow. For flow rates above capacity, however, the velocity through the aforementioned restriction becomes so great that the control pressure is reduced sufficiently to permit the regulator valve to lift high enough to increase the delivery pressure considerably over the set delivery pressure. This feature is somewhat dangerous and not at all desirable in a gas pressure regulator, because should the flow increase for any reason above design capacity, the resulting increase in actual delivery pressure would undoubtedly blow out any burners that were in operation.

Further, the fixed-orifice regulator must be designed for a specific pressure differential, i. e., to reduce a particular high inlet pressure to a particular low delivery pressure. For pressure differentials greater than the design differential, a fixed-orifice regulator will act to boost the delivery pressure above set delivery pressure even before capacity flow is obtained. In other words, a gas pressure regulator of the fixed-orifice type which is designed to reduce 5 p. s. i. inlet pressure to 7" W. C. outlet pressure will not operate satisfactorily if the inlet pressure is raised to, say 15 p. s. i. In this event, the delivery pressure will rise well above 7" W. C. even before capacity flow is obtained. Correspondingly, for pressure differentials less than the design differential, the actual delivery pressure will not reach the set delivery pressure through the design capacity range of the regulator.

The seat-ring type of regulator is typified by the disclosure in the patent to Niesmann, Reissue No. 21,597. This type of regulator again works on an aspirating principle, in that increased flow rates through the regulator effect reductions in the control pressure in order to lift the regulator valve higher to boost the actual delivery pressure up to the set delivery pressure. This type of regulator, however, has much the same delivery pressure vs. flow rate characteristics as that of the fixed-orifice type regulator, in that at flow rates above capacity the actual delivery pressure is boosted far above the set delivery pressure. Further, the seat-ring type of gas regulator also must be designed for a specific pressure differential and will not operate satisfactorily at other pressure differentials.

The above described disadvantages of the "seat-ring" and "fixed-orifice" type of regulators apparently are due to the fact that the control pressure is affected primarily by flow and that therefore the regulator valve tends to be opened a particular amount for a particular flow regardless of inlet pressure. Hence, a high inlet pressure correspondingly increases the delivery pressure for a given flow, and vice versa.

Accordingly, it is an object of this invention to provide a gas pressure regulator of the type described that will maintain a substantially constant delivery pressure, throughout its capacity flow range, for a wide range of pressure differentials.

It is another object of this invention to provide a gas pressure regulator of the type under consideration which not only will maintain a substantially constant delivery pressure throughout its design flow capacity range and for a wide range of pressure differentials, but also will effect decreases in actual delivery pressure below set delivery pressure at flow rates greater than design capacity.

It is another object of this invention to provide a gas pressure regulator for accomplishing the above objects which is extremely simple in design and consequently economical to manufacture and maintain, and easy to install and adjust.

It is another object of this invention to provide a gas pressure regulator of the type described with a simplified safety device for shutting off the flow of gas therethrough either in the event of rupture of the diaphragm or a decrease in inlet pressure below set delivery pressure, such device including resetting means that is operable without escape of gas.

Other objects and advantages of the invention will become evident from the following description and accompanying drawings, in which:

Figure 2 is an enlarged fragmentary view corresponding to Figure 1 but showing the regulator valve partially open.

Figure 3 is a view corresponding to Figure 2 but showing the regulator valve in substantially full open position.

Figure 4 is a fragmentary sectional view taken on line 4—4 of Figure 1.

Figure 5 is a fragmentary sectional view taken on line 5—5 of Figure 1.

Figure 6 is a fragmentary sectional view taken on line 6—6 of Figure 1.

Figure 7 is an exploded perspective view of the regulator valve and the valve guide member.

Figure 8 is a perspective view of the valve guide member shown in Figure 7 but taken from the opposite side of the guide member.

Figure 9 is a chart of performance curves of a "seat-ring" type of gas pressure regulator at various inlet pressures.

Figures 10 is a chart of performance curves of a "fixed-orifice" type of gas pressure regulator at various inlet pressures.

Figure 11 is a chart of performance curves of a gas pressure regulator embodying this invention at various inlet pressures.

*The invention*

Figure 1:
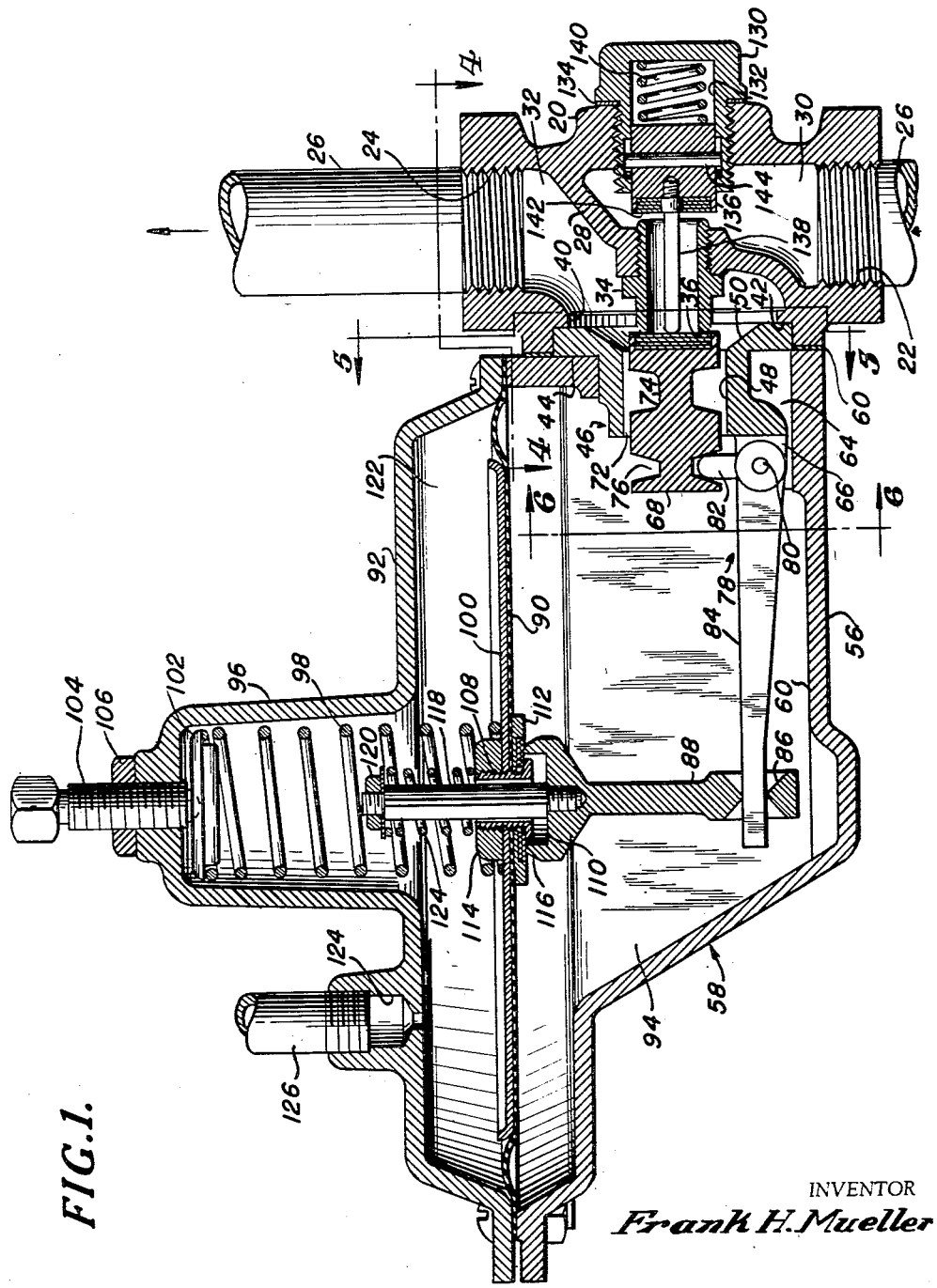
Figure 1 is a vertical sectional view through a gas pressure regulator embodying this invention, and showing the position of the regulator parts under no flow conditions, i. e., with the regulator valve closed.

Referring now to the drawings, there is shown in Figure 1 a gas pressure regulator embodying this invention. The regulator has a valve housing or fitting 20 provided with interiorly threaded and axially aligned inlet and outlet ports 22 and 24, respectively, for connection into a service line 26. An inclined transverse wall or partition 28 within the housing 20 divides the interior thereof into an inlet chamber 30 and an outlet or recovery chamber 32. Threaded through the partition 28 and extending transversely of the axis of the inlet and outlet ports 22 and 24 is an orifice fitting or nipple 34 having, within the recovery chamber 32, a rounded end edge that forms an annular valve seat 36. That side of the valve housing 20 adjacent the valve seat 36 is exteriorly enlarged to provide a square flange 38 having a flat outer surface, as best shown in Figure 5. The flange 38 has a central enlarged circular opening 40 (Figure 5) coaxial with the annular valve seat 36. The opening 40 is counterbored to provide an interior shoulder 42 on which seats a circumferential flange 44 on one end of a tubular valve guide 46 which has a central circular opening 48 coaxial with the valve seat 36. The end of the valve guide 46 facing the valve seat has a concavo-frusto-conical surface 50 for reasons, and the details of which will be, later described.

Equally spaced screws 52 at the four corners of the flange 38 detachably secure the valve housing 20 to a corresponding flange 54 on the side of the base 56 of a diaphragm casing 58 with an appropriate gasket 60 interposed therebetween. The outer side of the valve guide flange 44 is substantially flush with the outer surface of the fitting flange 38 so that the valve guide 46 is firmly clamped between the valve housing 20 and the diaphragm casing base 56. Because of the location of the screws 52, the valve fitting 20 may be disposed in any one of four different angular positions with respect to the diaphragm casing 58, each spaced 90° apart. These several possible positions of the valve fitting 20 with respect to the casing 58 greatly facilitate installation of the regulator by providing ready accommodation to different piping situations.

The base 56 of the diaphragm casing 58 is of open-top, shallow dished, circular form and is provided with a trough-like depression 60 in its bottom extending inwardly from an opening 62 in its side wall aligned with the side opening 40 in the valve fitting 20. The tubular valve guide 46 is received within the casing base opening 62 and extends into the trough-like depression 60. The outer end of the depression 60 is of reduced width adjacent its bottom to provide a channel having opposed side walls 64 (Figure 6) which snugly engage the outer sides of a pair of spaced apertured lugs 66 extending laterally and inwardly from the valve guide 46.

A valve member or head 68 is slidably mounted within the central cylindrical opening 48 of the valve guide 46 and is provided at one end thereof with the usual countersunk valve washer 70 for sealing engagement with the valve seat 36. The exterior of that portion of the valve member 68 received within the guide 46 is hexagonal, as shown, to provide a plurality of ducts 72, between the outer surface of the valve member and the side wall of the central opening 48 in the valve guide 46, that provide communication between the recovery chamber 32 and the interior of the diaphragm-casing base 56. The valve member 68 may be provided with an outer circumferential groove 74 immediate its ends in order to reduce its weight and, hence, its inertia to movement. One end of the valve member 68 projects out of the valve guide 46 and into the interior of the diaphragm-casing base 56 and is provided with a circumferential groove 76 having outwardly diverging side walls.

Reciprocation of the valve member 68 is effected by a bell crank lever 78, which is pivotally mounted between the two apertured lugs 66 on the valve guide 46 by a pivot pin 80 and has the gear-tooth-shaped end of a short arm 82 fitting in the groove 76. The pivot pin 80 is retained in operating position by the opposed inner walls 64 of the diaphragm-casing base 56. The other and longer arm 84 of the bell crank lever 78 extends into the depression 60 in the diaphragm-casing base 56 and snugly through a circular opening 86 in the end of a diaphragm pusher post 88. Preferably the edges of the opening in the post 86 are oppositely bevelled, as shown, to provide an inner knife edge which reduces friction between the post 88 and the arm 84 of the bell crank lever 78.

A diaphragm 90 is clamped between the circular rim of the diaphragm-casing base 56 and a diaphragm-casing cap or bonnet 92 to form, in conjunction with the diaphragm-casing base, a pressure or control chamber 94. The bonnet 92 has a central hollow extension or enlargement 96 for the reception of a coil compression spring 98, one end thereof bearing against a diaphragm backing plate 100 and the other end thereof against a thrust washer 102. The compression of the spring 98 can be adjusted by an adjusting bolt 104 threaded through the closed end of the hollow bonnet extension 96 and bearing against the thrust washer 102. The bolt 104 is provided conventionally with a lock nut 106.

The diaphragm 90 and plate 100 have aligned central openings through which extends an exteriorly threaded sleeve 108 having a circumferential flange or head 110 at the control-chamber side of the diaphragm. An annular washer 112, having gasket material countersunk therein to provide a valve seat, is interposed between the sleeve flange 110 and the diaphragm 90, and the sleeve 108 and washer 112 are clamped tightly to the diaphragm by a nut 114 threaded onto the other end of the sleeve. The upper end of the pusher post 88 has a bell-like formation 116 having the rim thereof engaged against the valve seat provided by the washer 112. Threaded into the upper end of the pusher post 88 and extending with clearance through the sleeve 108 is a stud 118 having a nut 120 threaded on that end thereof extending into the bonnet chamber 122. A small compression spring 124 is interposed between the nut 114 on the sleeve and the nut 120 on the stud.

By means of this arrangement, the small spring 124 normally holds the rim of the bell-like formation 116 firmly against the washer 112, and the regulator operates conventionally, i. e., the spring 98 acts through the post 88 and lever 78 to urge the valve member 68 to open while pressure in the control chamber 94 acts on the diaphragm 90 to urge the valve member to close. Should the pressure within the control chamber 94 become excessive, however, the diaphragm 90 will lift sufficiently to pull the washer 112 away from the rim of the bell-like formation 116. Thereupon, gas can flow from the control chamber 94 through the space between the stud 118 and the interior of the threaded sleeve 108 into the bonnet chamber 122 on the other side of the diaphragm. This bonnet chamber 122 is vented to the atmosphere through a vent port 124 which may have a conduit 126 connected thereto for conducting the escaping gas to the exterior of the dwelling. Pressure might become excessive within the control chamber 94 if the regulator valve fails to seat properly when pressure conditions call for it to seat, that is, the valve is urged in a direction to seat, but there may be dirt on the seat which prevents a proper seal.

The inlet chamber 30 of the valve fitting 20 has a threaded side opening 128 coaxial with the valve seat nipple 34. Threaded into such opening 128 from the outside of the fitting 20 is a cap-like plug 130 having a cylindrical recess 132 in its inner end. An appropriate sealing gasket 134 may be interposed between an outer flange on the plug 130 and the abutting surface of the valve fitting 20. Slidably carried in the cylindrical recess 132 is a piston-like element 136 having a push rod 138 extending from one end thereof through the valve seat nipple 34 and into engagement with the end of the regulator valve member 68. A coil compression spring 140 is interposed between the other end of the element 136 and the bottom of the recess 132 in the plug 130. The one end of the element 136 also has a valve washer 142 countersunk therein for sealing engagement with that end of the valve seat nipple 34 which projects into the inlet chamber 30 of the valve fitting 20. Extending transversely through the piston-like element 136 is a pin 144 having the radially projecting ends thereof received within oversized longitudinal slots 146 in the sides of the plug 130 to thereby limit axial movement of the piston-like element.

Normally, the valve washer 142 is held off the end of the valve seat nipple 34 by the engagement of the push rod 138 with the regulator valve member 68. In the event, however, that the diaphragm 90 breaks or ruptures to thereby permit the regulator spring 98 to open the regulator valve wide, the piston-like element 136 will move to seat the valve washer 142 against the corresponding end of the valve seat nipple 34 and prevent gas from passing into the recovery chamber 32. The same result will be had if the inlet pressure drops below the set delivery pressure of the regulator to permit the regulator spring 98 to open the regulator valve wide.

In the event that this safety valve arrangement closes, the valve washer 142 will be held against the corresponding end of the valve seat nipple 34 by the small coil compression spring 140, and this safety valve arrangement cannot be opened except by backing off the plug 130 so that the innermost ends of the slots 146 in the side walls of the plug will engage with the projecting ends of the transverse pin 144 to pull the piston-like element 136 off its seat. This opening of the safety valve may be accomplished without complete removal of the plug 130 from the valve fitting 20, so that, when gas pressure has been restored in the inlet chamber 30 prior to resetting of the safety valve arrangement, gas will not escape during the resetting operation. After the plug 130 has been unthreaded sufficiently to pull the element 136 off its seat, gas pressure operating in the control chamber 94 will cause re-engagement of the regulator valve 68 with the push rod 138 to maintain the element 136 off its seat. Thereupon, the plug 130 may be retightened and the safety arrangement will again be in condition to shut off gas flow in the event of diaphragm rupture or reduction of inlet pressure below set delivery pressure.

*Operation*

The general operation of the regulator is somewhat conventional, in that the main regulator spring 98 acts through the pusher post 88 and bell crank lever 78 to open the valve member 68, while control pressure admitted to the control chamber 94 through the ducts 72 acts on the diaphragm 90 in an opposite direction to close the valve. Thus, the high static pressure of the fluid in the inlet chamber 30 is reduced to a very low static pressure while flowing at high velocity through the very restricted opening between the regulator valve member 68 and its seat 36, such low pressure usually being termed "seat flow" pressure. The seat flow stream expands and thereby reduces its velocity after emergence from the valve opening, with consequent partial recovery of static pressure in the recovery chamber 32. The regulator differs from prior types, however, in that the control pressure supplied to the control chamber 94 is a variable blend of two pressures, the proportions of each of which are varied in accordance with the degree of the opening of the regulator valve. In principle, this control pressure operates in somewhat the same manner as the control pressure provided for the regulator disclosed in the copending application of Frank H. Mueller, Serial No. 642,817, filed January 23, 1946, now Patent No. 2,628,454.

The control pressure disclosed in the aforementioned application changes with different pressure differentials so that on higher differentials the percentage of valve opening or lift will be lower, with proportionate lower percentage of pressure recovery. Conversely, on lower pressure differentials the percentage of valve opening will be higher with proportionate higher percentage of pressure recovery. Hence, the actual recovered pressure will tend to remain constant with different pressure differentials, as contrasted to either the old-type regulator or the new types which have been provided with compensating means operating on the ejector or aspirating principle. This control pressure disclosed in the aforementioned application is made up of a variable blend of the actual recovered pressure in the recovery chamber and the reduced seat flow pressure resulting from the high velocity flow in the restricted opening between the regulator valve member and its seat.

While admirably suitable for its purpose, that is, to maintain a constant delivery pressure over capacity flow ranges for different pressure differentials, the regulator disclosed in the aforementioned copending application has not proved to be completely suitable for use as a gas pressure regulator of the type described, wherein the pressure differentials or inlet vs. delivery pressure ratios are of the order of fom 20:1 to 60:1. Accordingly, by means of this invention, there is provided a gas pressure regulator which utilizes the principles disclosed in the aforementioned application and applies them to gas pressure regulators of the type described so that a substantially constant delivery pressure may be maintained from minimum to capacity flow rates at varying pressure differentials.

Referring now to Figures 2 and 3, it will be seen that the seat flow stream S emerges from the valve in a circular fan-like formation at high velocity and strikes at I, against the concavo-frusto-conical surface 50 at the end of the valve guide 46. As the stream S impacts this surface 46, the stream is deflected, that is, is caused to change direction, as shown. Hence, even though the stream S has a fairly high velocity immediately prior to impact with consequent reduction in static pressure, the kinetic energy lost by the stream because of the impact causes an increase in static pressure at the point of impact. Such impact pressure is of the order of the recovered pressure existing in the recovery chamber. Since the inlet ends of the ducts 72 are immediately adjacent to the stream S as it flows past the outer edge of the valve member 68 and also adjacent to the impact area I, the control pressure consists of a variable blend of the seat flow pressure, i. e., the reduced pressure occasioned by the high velocity of the seat flow stream, and the impact pressure.

It will be seen, however, that the area of impact of the seat flow stream is in the form of an endless band, and that the edge of the band or area nearer the minor diameter of the surface, and also nearer the inlet ends of the control pressure transmitting ducts 72, moves nearer the inlet ends of the ducts upon increases in thickness of the seat flow stream as the valve member 68 moves further away from the valve seat 36. Therefore, as the valve lifts higher, the edge of this impact area, and therefore the impact pressure, is brought nearer to the inlet ends of the control pressure ducts so that the influence of the impact pressure on the composite control pressure increases with increased valve openings. For this reason, it will be seen that, when the valve is at substantial maximum lift (a distance ordinary taken as 1/10 of the diameter of the circular line of contact between the valve member and its seat), the moving edge of the area of impact has been brought so close to the inlet ends of the control ducts, i. e., the control pressure pick-up point, that the impact pressure proportion of the variable blend is so predominating that the control pressure is raised sufficiently to cause an actual reduction in the delivery pressure below set delivery pressure.

The most widely used gas main pressures are from about 5 to about 15 p. s. i., and with inlet pressure of this order it has been found that a regulator seat diameter of ½″ will provide the required capacity flow of about 400 C. F. H. of gas of .6 specific gravity. In this instance, the bore of the seat nipple is 7/16″, i. e. 1/16″ less than the diameter of the circular line of sealing contact of the valve seat 36 at the end of the bead or rounded edge of the nipple 34. With these proportions, it has been determined that the angle which the inclined wall of the concavo-frusto-conical valve guide surface 50 makes with the plane of the valve seat 36 should be about 36°, i. e., the included angle of the frusto-conical surface is 108°. Valve lifts or seat openings for ½″ diameter seats at normal flow rates and at inlet pressures of about 5 to 15 p. s. i. are of the order of 10/1000″ to 20/1000″. With higher inlet pressures the valve lift for any one flow rate would decrease proportionately. A reduction in such lifts at higher inlet pressures is undesirable, however, because a reduction below the aforementioned values would provide a flow opening that would amount to little more than a leak, and at the higher pressure the resultingly higher velocity through such a small opening would actually tend to cut or score the valve seat. Hence, in order to maintain the seat opening or valve lift at 10/1000″ to 20/1000″, at higher inlet pressures the diameter of the valve seat is correspondingly reduced while retaining the same valve member. Thus, for example, at an inlet pressure of from 10 to 25 p. s. i., it is customary in the gas regulator art to use a 5/16″ valve seat (¼″ valve port or orifice) and at from 20 to 75 p. s. i., a 3/16″ valve seat (⅛″ orifice).

Because of these conventional changes in seat diameters, it has been found that at ranges of about from 5 to 75 p. s. i. inlet pressure for reduction to about 7″ W. C. set delivery pressure the aforementioned angle of 36° for the frusto-conical-surface 50 is satisfactory. The reason for this is that, since at the higher pressures and consequently reduced seat diameter, the effect of the seat flow pressure on the variable blend constituting the control pressure is reduced, i. e., the point of maximum velocity of the seat flow stream is moved radially inwardly (i. e., toward the axis of the valve) away from the pick-up point of the control pressure, so that in effect the seat flow pressure is increased at the higher pressures. Were the seat diameter not so reduced at increasing pressures, the aforementioned 36° angle would have to be increased in order to make the impact pressure a more predominant part of the variable blend constituting the final control pressure. Since it is rather impractical to make the seat diameter less than about 3/16″, at inlet pressures from about 60 to 125 p. s. i., the 36° angle must be increased somewhat for the aforestated reasons.

At inlet pressures of from 1 to about 2 p. s. i. a valve seat diameter larger than ½″ is necessary in order to maintain a desirable valve lift of the order of from 10/1000″ to 20/1000″. At these lower inlet pressures a decrease in the aforementioned 36° angle is necessary in order to decrease the influence of the impact pressure on the variable blend constituting the control pressure, i. e., the construction disclosed in the aforementioned copending application is approached wherein the seat flow stream does not impact against a surface. At 2 to 5 p. s. i. inlet pressure, a ½″ seat diameter is proper, but the aforementioned angle should lie somewhere between 36° and the lesser angle used from 1 to 2 p. s. i. inlet pressure.

The actual advantages of a pressure regulator embodying this invention may be best seen from an inspection of the delivery pressure versus flow rate charts shown in Figures 9, 10, and 11. Each chart illustrates the performance of a typical regulator at various inlet pressures and with all of the regulators adjusted to 6″ W. C. delivery pressure at "lock-off," i. e., at minimum flow (20 C. F. H.), for each inlet pressure. Since the data for these charts was collected by operating regulators with air, as contrasted to gas of .6 specific gravity, capacity flow occurred at 300 C. F. H. instead of at 400 C. F. H.

The seat ring type of regulator reduces the pressure drop inherent in the old-type regulator but possesses the previously described disadvantage of permitting delivery pressure to rise above set delivery pressure at flows over maximum capacity. This disadvantage is clearly evident in the chart illustrated in Figure 9 which shows the performance curves of a regulator of the type disclosed in the aforementioned patent to Niesmann, Re. 21,597. It will be seen that at an inlet pressure of 2½ p. s. i. the regulator performs very well and maintains a substantially constant delivery pressure, less than 1″ W. C. below lock-off, up to capacity flow. Even at this low inlet pressure the tendency for the delivery pressure to rise at flows above capacity is clearly evident. At inlet pressures above 2½ p. s. i., however, the delivery pressure at capacity flow is well above lock-off, and even set delivery pressure, and becomes progressively greater with increasing inlet pressure. At 12½ p. s. i. inlet pressure, delivery pressure at capacity flow is 2″ W. C. over lock-off and the curve is still rising. Thus, the seat-ring type of compensation overcomes the pressure drop difficulty, as is shown by the broken line curves obtained when the seat ring is removed, but compensates too much in this particular design.

The fixed-orifice type of regulator also reduces the pressure drop inherent in the old-type regulator, as is best seen from an inspection of the chart illustrated in Figure 10. This chart shows the performance of a fixed-orifice type of regulator of the type having a Pitot tube, the inlet end of which is disposed in a restricted opening leading to the delivery outlet from the recovery chamber for communicating a control pressure to the control chamber. This type of gas pressure regulator is shown, for example, in Patent No. 2,577,480. From an inspection of the chart illustrated in Figure 10, it will be seen that the specific regulator on which the test was run performs very well throughout the test range of inlet pressure, having a pressure drop at capacity flow and at an inlet pressure of 2½ p. s. i. of only about 1″ W. C. The regulator performs little better at increased inlet pressure, however, and the pressure drop is over ½″ W. C. even at inlet pressures of the order of 8 to 12½ p. s. i. It also will be noted that in the specific regulator tested the actual delivery pressure does not increase at flow rates beyond maximum capacity, i. e., over 300 C. F. H. The reason for this is that the compensating means was designed to have little effect, i. e., the flow restriction was not made small enough to cause very high velocities through such restriction. Thus, in this construction there is a compromise between substantially completely eliminating the pressure drop at capacity flow rates and permitting increases in actual delivery pressure at flow rates over capacity.

The good characteristics of this particular fixed-orifice regulator are obtained primarily by basic design instead of by compensating means, as is shown by the broken-line curves obtained on removal of the Pitot tube, i. e., the compensating means. An uncompensated regulator having good performance characteristics, however, is very sensitive and may be so unstable as to chatter or hunt. A basically good regulator may be obtained by a long delicate opening spring having minimum change in load on extension, and by other means, but the balance of forces at the different valve positions are so close together that they can be unbalanced by flow conditions. Hence, a regulator having poor basic performance that is corrected by compensating means is a better regulator than an uncompensated regulator having good basic performance.

The chart illustrated in Figure 11 shows the performance curves of a gas pressure regulator embodying this invention. It will be noted that at inlet pressure of 2½ p. s. i. the pressure drop at capacity flow is only 1″ W. C., thus comparing favorably with the performance of both the fixed-orifice and seat-ring type of regulators at this inlet pressure. Increasing inlet pressures, however, progressively reduce the pressure drop in a regulator embodying this invention, so that an inlet pressure of 5 p. s. i. the pressure drop is only ½″ W. C., and at inlet pressure of 8 p. s. i. the pressure drop is only about ¼″ W. C. At an inlet pressure of 12½ p. s. i., the delivery pressure is slightly above lock-off but not above set delivery pressure. Thus, at the higher inlet pressures a regulator embodying this invention performs exceptionally well, and at an inlet pressure of 12½ p. s. i. the performance curve is about as near perfect as possible. It also will be particularly noted that at flows over capacity the delivery pressure progressively decreases, thus completely avoiding any dangerous situation resulting from flows over maximum design capacity. All of these benefits are obtained from a regulator that has rather poor basic performance, as is shown in the broken-line curves wherein the nipple 34 was shortened and the valve member 68 lengthened so that the seat flow stream was removed from both the surface 50 and the inlet end of the ducts 72 to thus eliminate the compensating means. Hence, a regulator embodying this invention can have both stability and good performance.

It will thus be seen that the objects of this invention have been fully and effectively accomplished. It will be realized, however, that various changes may be made in the specific embodiment of the invention illustrated and described to disclose the principles of this invention without departing from such principles. Therefore, this invention includes all modifications encompassed by the spirit and scope of the following claims.

I claim:

1. In a fluid pressure regulator having means defining a recovery chamber provided with an inlet port, valve means controlling the inlet port, means yieldingly urging the valve means toward open position means defining a control pressure chamber provided with a movable wall, and connections between the movable wall and the valve means for moving the latter toward closed position upon movements of the wall outwardly of the control chamber, the combination of means for communicating to the control chamber a variable blend of the recovered pressure in the recovery chamber and the reduced pressure resulting from high velocity flow through the variably opened valve means, the recovered pressure proportion of said blend being approximately directly proportional to the degree of opening of the valve means.

2. A fluid pressure regulator comprising: a housing having an inlet opening and an outlet opening; means including a wall between said openings defining a recovery chamber in communication with said outlet opening; valve means including an annular member and a cooperating body member, one of said members constituting a seat for the other and one being fixed and the other being movable toward and away therefrom, said annular member being disposed in and sealing with an opening in said wall and providing a flow port from said housing inlet to said recovery chamber; means including a movable wall defining a control chamber; regulable means yieldingly urging said movable wall inwardly of said control chamber; means connecting said movable wall and said movable valve member and acting to move said movable valve member away from said fixed valve member upon movement of said movable wall inwardly of said control chamber; means in said recovery chamber defining a surface symmetrical with respect to the axis of said annular valve member and having one of said valve members extending therethrough, said surface and said valve members being so arranged that the seat flow stream emerging from between said valve members impacts in an endless coaxial band against said surface, one edge of said band being movable in accordance with the degree of separation of said valve members; and a duct for communicating to said control chamber a variable blend of the impact pressure and the seat flow pressure, the impact pressure proportion of said blend corresponding to the degree of separation of said valve members.

3. The structure defined in claim 2 in which the annular valve member is fixed in said wall opening and the body valve member is movable.

4. The structure defined in claim 2 in which the symmetrical surface is concavo-frusto-conical.

5. The structure defined in claim 2 in which the symmetrical surface is concavo-frusto-conical and has an included angle of the order of 108°.

6. The structure defined in claim 2 in which the symmetrical surface is frusto-conical, and the duct has a point of termination in the recovery chamber adjacent the minor diameter of said surface.

7. A fluid pressure regulator comprising: a housing having an inlet opening and an outlet opening; means including a wall between said openings defining a recovery chamber in communication with said outlet opening; valve means including an annular member and a cooperating body member, one of said members constituting a seat for the other and one being fixed and the other being movable toward and away therefrom, said annular member being disposed in and sealing with an opening in said wall and providing a flow port from said housing inlet to said recovery chamber; means including a movable wall defining a control chamber; regulable means yieldingly urging said movable wall inwardly of said control chamber; means connecting said movable wall and said movable valve member and acting to move said movable valve member away from said fixed valve member upon movement of said movable wall inwardly of said control chamber; means in said recovery chamber defining a surface symmetrical with respect to the axis of said annular valve member and having one of said valve members extending therethrough, said surface and said valve members being so arranged that the seat flow stream emerging from between said valve members impacts in an endless coaxial band against said surface, the width of said band varying in accordance with the degree of separation of said valve members; and a duct for communicating to said control chamber the impact pressure as a correspondingly varied blend with the reduced seat flow pressure.

8. A fluid pressure regulator comprising: a housing having an inlet opening and an outlet opening; means including a wall between said openings defining a recovery chamber in communication with said outlet opening; valve means including an annular member and a cooperating body member, one of said members constituting a seat for the other and one being fixed and the other being movable toward and away therefrom, said annular member being disposed in and sealing with an opening in said wall and providing a flow port from said housing inlet to said recovery chamber; means including a movable wall defining a control chamber; regulable means yieldingly urging said movable wall inwardly of said control chamber; means connecting said movable wall and said movable valve member and acting to move said movable valve member away from said fixed valve member upon movement of said movable wall inwardly of said control chamber; means in said recovery chamber defining a surface symmetrical with respect to the axis of said annular valve member and having one of said valve members extending therethrough, said surface and said valve members being so arranged that the seat flow stream emerging from between said valve members impacts in an endless coaxial band against said surface, one edge of said band being movable in accordance with the degree of separation of said valve members; and a duct for supplying pressure to said control chamber, said duct having a point of termination in said recovery chamber adjacent the base of the seat flow stream and spaced from the plane of the outer edge of the sealing surface of said annular member a distance of the order of the maximum separation between said members.

9. A fluid pressure regulator comprising: a housing having an inlet opening and an outlet opening; means including a wall between said openings defining a recovery chamber in communication with said outlet opening; valve means including an annular member and a cooperating body member, one of said members constituting a seat for the other and one being fixed and the other being movable toward and away therefrom, said annular member being disposed in and sealing with an opening in said wall and providing a flow port from said housing inlet to said recovery chamber; means including a movable wall defining a control chamber; regulable means yieldingly urging said movable wall inwardly of said control chamber; means connecting said movable wall and said movable valve member and acting to move said movable valve member away from said fixed valve member upon movement of said movable wall inwardly of said control chamber; means in said recovery chamber defining a surface symmetrical with respect to the axis of said annular valve member and having one of said valve members extending therethrough, said surface and said valve members being so arranged that the seat flow stream emerging from between said valve members impacts in an endless coaxial band against said surface, one edge of said band being movable in accordance with the degree of separation of said valve members; and a duct for supplying pressure to said control chamber, said duct having a point of termination in said recovery chamber immediately alongside one of said valve members and spaced from the plane of the outer edge of the sealing surface of said annular member a distance of the order of the maximum separation between said members.

10. A fluid pressure regulator comprising: a housing having an inlet opening and an outlet opening; means including a wall between said openings defining a recovery chamber in communication with said outlet opening; valve means including an annular member and a cooperating body member, one of said members constituting a seat for the other and one being fixed and the other being movable toward and away therefrom, said annular member being disposed in and sealing with an opening in said wall and providing a flow port from said housing inlet to said recovery chamber; means including a movable wall defining a control chamber; regulable means yieldingly urging said movable wall inwardly of said control chamber; means connecting said movable wall and said movable valve member and acting to move said movable valve member away from said fixed valve member upon movement of said movable wall inwardly of said control chamber; one of said valve members overlying the other and the opposed faces of said members being shaped so that when they are separated flow through said annular member is directed between said faces to said recovery chamber as a substantially radial seat flow stream; means in said recovery chamber defining a concavo-frusto-conical surface coaxial with said annular valve member, said surface being so arranged that said seat flow stream impacts in an endless coaxial band thereagainst, one edge of said band being variably spaced from the minor diameter of said surface in accordance with the degree of separation of said valve members; and a duct for communicating to said control chamber the impact pressure as a correspondingly varied blend with the reduced seat flow pressure.

11. A fluid pressure regulator comprising: means including a movable wall defining a control chamber; regulable means yieldingly urging said wall inwardly of said chamber; means defining a recovery chamber having an inlet port and an outlet port; a valve including an annular valve seat on the outlet side of said inlet port and a valve head in said recovery chamber cooperable with said seat; tubular means guiding said valve head for reciprocation coaxially with said seat; means connecting said wall and valve head for moving said valve head away from said seat upon movement of said wall inwardly of said control chamber; and a duct arranged to communicate to said control chamber the recovered pressure in said recovery chamber as a variable blend with the reduced seat flow pressure, the recovered pressure proportion of said blend varying in accordance with the degree of valve opening, said tubular means having a coaxial concavo-frusto-conical end face unobstructed by the valve head positioned to intercept the seat flow stream, and said duct being formed between said valve head and said tubular means and terminating in said recovery chamber at the minor diameter of said end face.

12. The structure defined in claim 11 in which the angle of inclination of the frusto-conical surface with respect to the plane of the valve seat is of the order of 36°.

13. The structure defined in claim 11 in which the plane of the minor diameter of the frusto-conical end face is spaced from the plane of the valve seat a distance slightly more than the maximum separation of the valve head from said seat.

14. The structure defined in claim 11 in which the plane of the minor diameter of the frusto-conical end face is spaced from the plane of the valve seat a distance slightly more than $1/10$ the diameter of said valve seat.

15. A fluid pressure regulator comprising: means including a movable wall defining a control chamber; regulable means yieldingly urging said wall inwardly of said chamber; means defining a recovery chamber having an inlet port and outlet port; a valve including an annular valve seat on the outlet side of said inlet port and a valve head in said recovery chamber cooperable with said seat; means mounting said valve head for reciprocation coaxially with said seat; means connecting said wall and valve head for moving the latter away from said seat upon movement of said wall inwardly of said chamber; means in said recovery chamber defining a concavo-frusto-conical surface coaxial with the seat flow stream emerging from between said head and seat, facing in the direction of movement of said head toward said seat, and being positioned to be impacted by the seat flow stream; and a duct for supplying pressure to said control chamber, said duct having a point of termination in said recovery chamber adjacent the minor diameter of said surface closely alongside said valve head.

16. In a fluid pressure regulator having means defining a recovery chamber provided with a circular inlet port and an outlet port, reciprocating valve means controlling the outlet end of said inlet port and producing a seat flow stream symmetrical about the axis of said inlet port, means yieldingly urging said valve means to open position, means defining a closed control chamber including a movable wall, and connections between said wall and said valve means for moving the latter toward closed position upon movement of said wall outwardly of said control chamber, the combination of means in the recovery chamber defining a surface symmetrical about the axis of the inlet port and extending about the seat flow stream in position to be impacted thereby in an endless coaxial band, the width of said band varying in accordance with the degree of opening of the valve means, and duct means for communicating to the control chamber a correspondingly varied blend of the impact pressure and the reduced seat flow pressure.

17. A fluid pressure regulator comprising: a valve fitting having aligned inlet and outlet ports adapted for connection into a line and a lateral opening; an interior wall dividing said fitting into inlet and recovery chambers; a seat nipple threaded through said wall to define a flow port having an annular valve seat at its outlet end facing said fitting lateral opening; a dished diaphragm casing base having a trough-shaped depression in the bottom thereof aligned with an opening in a side wall thereof; means for securing said base to said fitting in a plurality of relative angular positions about the axis of said valve seat with said base opening aligned with said fitting opening; a tubular valve guide clamped between said base and fitting and disposed in said openings, said guide and fitting being relatively rotatable about said axis; a valve member slidable in said guide and cooperable with said seat; a bonnet closing said base; a flexible diaphragm clamped between said bonnet and base to define, with the latter, a control chamber; a regulable spring interposed between said bonnet and said diaphragm to yieldingly urge the latter inwardly of said control chamber; connections between said diaphragm and said valve member for moving the latter away from said seat upon said inward diaphragm movement; and means defining a duct between said valve member and said guide for communicating to said control chamber a control pressure from said recovery chamber, said duct being symmetrically disposed about said valve member.

18. The structure defined in claim 17 in which the valve guide includes a circumferential circular flange having an uninterrupted periphery coaxial with the valve seat and fitting in a complementary recess in the valve fitting.

19. A fluid pressure regulator comprising: a valve fitting having aligned inlet and outlet ports adapted for connection into a line and a lateral opening; an interior wall dividing said fitting into inlet and recovery chambers; a seat nipple threaded through said wall to define a flow port having an annular valve seat at its outlet and facing said fitting lateral opening; a dished diaphragm casing base having a trough-shaped depression in the bottom thereof aligned with an opening in a side wall thereof, said base being secured to said fitting with said base opening aligned with said fitting opening; a tubular valve guide clamped between said base and fitting and disposed in said opening; a valve member slidable in said guide and cooperable with said seat; a bonnet closing said base; a flexible diaphragm clamped between said bonnet and base to define, with the latter, a control chamber; a regulable spring interposed between said bonnet and said diaphragm to yieldingly urge the latter inwardly of said control chamber; connections between said diaphragm and said valve member for moving the latter away from said seat upon said inward diaphragm movement, said connections including a pivotal lever; a pair of spaced apertured lugs projecting laterally from said valve guide and receiving said lever therebetween; a pivot pin extending through said lugs and said levers; opposed spaced walls in said recess in said diaphragm casing base snugly receiving said lugs therebetween; and means defining a duct between said valve member and said guide for communicating to said control chamber a control pressure from said recovery chamber.

20. A fluid pressure regulator comprising: a valve fitting having aligned inlet and outlet ports adapted for connection into a line and a lateral opening; an interior wall dividing said fitting into inlet and recovery chambers; a seat nipple threaded through said wall to define a flow port having an annular valve seat at its outlet and facing said fitting lateral opening; a dished diaphragm casing base having a trough-shaped depression in the bottom thereof aligned with an opening in a side wall thereof, said base being secured to said fitting with said base opening aligned with said fitting opening; a tubular valve guide clamped between said base and fitting and disposed in said openings; a valve member slidable in said guide and cooperable with said seat, the end face of said valve guide in said recovery chamber being concavo-frusto-conical and located to be impacted by the seat flow stream emerging from between said valve member and said seat; a bonnet closing said base; a flexible diaphragm clamped between said bonnet and base to define, with the latter, a control chamber; a regulable spring interposed between said bonnet and said diaphragm to yieldingly urge the latter inwardly of said control chamber; connections between said diaphragm and said valve member for moving the latter away from said seat upon said inward diaphragm movement; and means defining a duct between said valve member and said guide for communicating to said control chamber a control pressure from said recovery chamber.

21. The structure defined in claim 20 in which the included angle of the concavo-frusto-conical end face of the valve guide is of the order of 104°.

22. The structure defined in claim 20 in which the plane of the minor diameter of the end face of the valve guide is spaced from the plane of the valve seat a distance slightly more than the maximum separation between the valve member and said seat.

23. In a shut-off valve having a casing provided with an interior valve seat, a reciprocating valve head cooperating with the seat, means responsive to fluid pressure in the casing downstream of the seat normally urging the valve head off the seat, and means yieldingly urging the valve head to seat, the combination of manually-operable means for unseating the valve head, when seated, including a plug threaded through the casing opposite the valve seat and reciprocably mounting the valve head, and a lost motion connection between said plug and the valve head, whereby the latter may be unseated by partially unscrewing said plug.

24. In a shut-off valve having a casing provided with an interior valve seat, the combination comprising: a plug threaded through the casing opposite the valve seat and having a tubular guiding recess in the inner side thereof, said recess having a longitudinal slot in its side wall spaced from the open end of said recess; a valve head cooperating with the seat and reciprocably guided in said recess; a compression spring interposed between said valve head and the bottom of said recess; means responsive to fluid pressure downstream of the seat normally maintaining said valve head off the valve seat; and a lateral projection on said valve head disposed in said slot for lost-motion engagement with the end wall of the latter nearer the open end of said recess.

References Cited in the file of this patent

UNITED STATES PATENTS

| Number | Name | Date |
|---|---|---|
| 362,326 | Smith | May 3, 1887 |
| 513,649 | Mabone | Jan. 30, 1894 |
| 1,931,386 | Hughes | Oct. 17, 1933 |
| 2,011,764 | Hughes | Aug. 20, 1935 |
| 2,351,047 | Hughes | June 13, 1944 |
| 2,557,187 | Hanssen | June 19, 1951 |
| 2,577,480 | Peterson | Dec. 4, 1951 |
| 2,581,071 | Born | Jan. 1, 1952 |
| 2,616,659 | Grahling | Nov. 4, 1952 |
| 2,619,983 | Roberts | Dec. 2, 1952 |
| 2,628,454 | Mueller | Feb. 17, 1953 |